United States Patent [19]

Olivarez, Jr. et al.

[11] Patent Number: 4,687,439
[45] Date of Patent: Aug. 18, 1987

[54] FURNACES FOR BAKING ANODES

[75] Inventors: Flavio Olivarez, Jr., College Station; Richard J. Walla, Katy, both of Tex.

[73] Assignee: Aluminum Company of America & Delta Refractories, Inc.

[21] Appl. No.: 834,523

[22] Filed: Feb. 28, 1986

[51] Int. Cl.⁴ .......................... F27B 7/00; F27D 1/18
[52] U.S. Cl. .................................... 432/192; 432/193; 432/194; 432/250
[58] Field of Search ................. 432/192–194, 432/144, 148, 150, 200, 205, 209, 212, 250

[56] References Cited

U.S. PATENT DOCUMENTS

| | | | |
|---|---|---|---|
| 1,529,621 | 3/1925 | Hagan | 432/194 |
| 2,917,297 | 12/1959 | Schramm et al. | 432/209 |
| 3,796,538 | 3/1974 | Howorth | 432/250 |
| 3,975,149 | 8/1976 | Racunas et al. | 432/209 |
| 4,025,287 | 5/1977 | Racunas et al. | 431/189 |
| 4,097,228 | 6/1978 | Rosling | 432/250 |
| 4,269,592 | 5/1981 | Benton et al. | 432/192 |
| 4,371,333 | 2/1983 | Moser et al. | 432/193 |
| 4,382,778 | 5/1983 | Peacey et al. | 432/192 |
| 4,406,619 | 9/1983 | Oldengott | 432/250 |
| 4,427,378 | 1/1984 | Bowers | 432/250 |
| 4,596,526 | 6/1986 | Soliman | 432/205 |
| 4,597,341 | 7/1986 | Suey | 432/250 |

Primary Examiner—Henry C. Yuen
Attorney, Agent, or Firm—Andrew Alexander; John P. Taylor

[57] ABSTRACT

An improved exhaust port plug is provided for use in a baking furnace for the baking of anodes for use in an electrolytic reduction cell. The improved exhaust port plug comprises a cylindrical metal shell having a diameter approximating the diameter of the port, a cover member on the shell having a dimension exceeding the diameter of the port, a gasket means on the underside of the cover member surrounding the shell and adapted to sealingly engage an external portion of the furnace, a mat of packed ceramic fibers within the shell, and retaining means to retain the mat of ceramic fibers within the metal shell.

12 Claims, 6 Drawing Figures

FURNACES FOR BAKING ANODES

BACKGROUND OF THE INVENTION

1. Field of the Invention

This invention relates to improvements in furnaces for baking carbon anodes used in an electrolytic reduction cell. More particularly, this invention relates to an improved baking furnace characterized by a plurality of improved insulated exhaust port plugs therein.

2. Description of the Related Art

Carbon anodes used in electrolytic reduction cells, such as the Hall cells used for the reduction of molten alumina to aluminum, are prepared by baking in a furnace commonly referred to as a ring furnace. Such a furnace is described in Racunas et al U.S. Pat. No. 3,975,149, assigned to an assignee of this invention and cross-reference to which is hereby made.

Such furnaces typically comprise a number of adjacent sections, varying from 60 to 96, each of which may, in turn, comprise 6 to 9 pits in which the anodes to be baked are placed. Each pit has endwalls made of refractory material and sidewalls comprising hollow refractory flues through which hot gases are passed to heat and bake the anodes in the pits. These flues are serially connected together from one pit to the next to permit flow of hot gases from the hollow flues comprising the sidewalls of one pit to the corresponding sidewalls in an adjacent pit. Each flue is provided with a cover or top having one or more ports therein through which intake air, fuel or exhaust gases may pass, as the case may be.

The ports leading to the respective flues are normally closed by the insertion of a removable insulated plug therein. When anodes are to be baked in a particular pit or series of adjacent pits, the covers to the corresponding flues are removed and heating means are inserted in the openings. Such heating means may include a device for feeding fuel into the flue such as described in Racunas et al U.S. Pat. No. 4,025,287, assigned to an assignee of this invention and cross-reference to which is hereby made.

To maximize the efficiency of the furnace, it is customary to bake anodes in a one or more pits in a series and then, while the anodes are cooling, to bake anodes in adjoining pits. Combustion air is then brought in through the uncovered ports in the flues of pits in which the baked anodes are cooling to permit preheating of the air before burning by circulating air over the previously baked, but still hot, anodes. The exhaust gases, in turn, pass out of the flues of the pits in which the anodes are baking and are customarily circulated through adjoining flues of pits in which anodes to be baked have been placed. In this way the heat of previously baked anodes is used to preheat the air used in combustion and the hot exhaust gases are used to preheat anodes yet to be baked.

It is customary to bake the anodes for an extended period of time of about 30 to 35 hours. When the baking period for each pit or group of pits is over, the firing means are moved to the next series of ports which may comprise ports which previously served as the exhaust ports. Correspondingly, the previous air intake ports are closed by the insertion of cover plugs, and the ports previously occupied by the firing means become the air intake ports as the anodes in these pits cool. Plugs covering the ports of flues in the next set of pits are then removed to serve as the new exhaust ports. This procedure continues to be repeated as the baking furnace operates on a continuous basis.

Over an extended period of operation, of necessity, a number of plugs must be removed or inserted to respectively uncover or cover ports to the respective flues as the firing progresses from pit to pit or section to section, as the case may be. Since the plugs must be able to withstand exposure to combustion temperatures, the plugs must comprise a refractory material capable of withstanding such temperatures. Solid refractory materials, e.g., a ceramic plug, would be satisfactory from a standpoint of temperature but would result in an unacceptable weight in view of the frequent and multiplied insertions and removals of the plugs.

It has, therefore, been customary to utilize a plug made from ceramic fibers held together in an organic binder. Unfortunately, during use, such organic binders eventually burn away and the plug must be replaced.

It would, therefore, be desirable to have a baking furnace with removable plugs which, while retaining the lightweight characteristics of prior art plugs, would be better able to withstand the heat to which the plug will be exposed during operation of the furnace.

SUMMARY OF THE INVENTION

It is, therefore, an object of this invention to provide an improved baking furnace for anodes used in the production of metal in an electrolytic reduction cell characterized by the provision of a removable plug in a port in the furnace comprising light weight material capable of withstanding the operating temperatures of the furnace.

It is another object of the invention to provide such a removable plug constructed using ceramic binders in the absence of organic binders.

It is yet another object of this invention to provide such a removable plug comprising ceramic fibers encased in a metal shell to contain the fibers in the absence of organic binders.

These and other objects of the invention will be apparent from the following description and accompanying drawings.

In accordance with the invention, in a baking furnace for the baking of anodes for use in an electrolytic reduction cell, an improved exhaust port plug is provided which comprises a cylindrical metal shell having a diameter approximating the diameter of the port, a cover member on the shell having a dimension exceeding the diameter of the port, a gasket means on the underside of the cover member surrounding the shell and adapted to sealingly engage an external portion of the furnace, a mat of packed ceramic fibers within the shell, and retaining means to retain the mat of ceramic fibers within the metal shell.

DETAILED DESCRIPTION OF THE INVENTION

Figure 1:
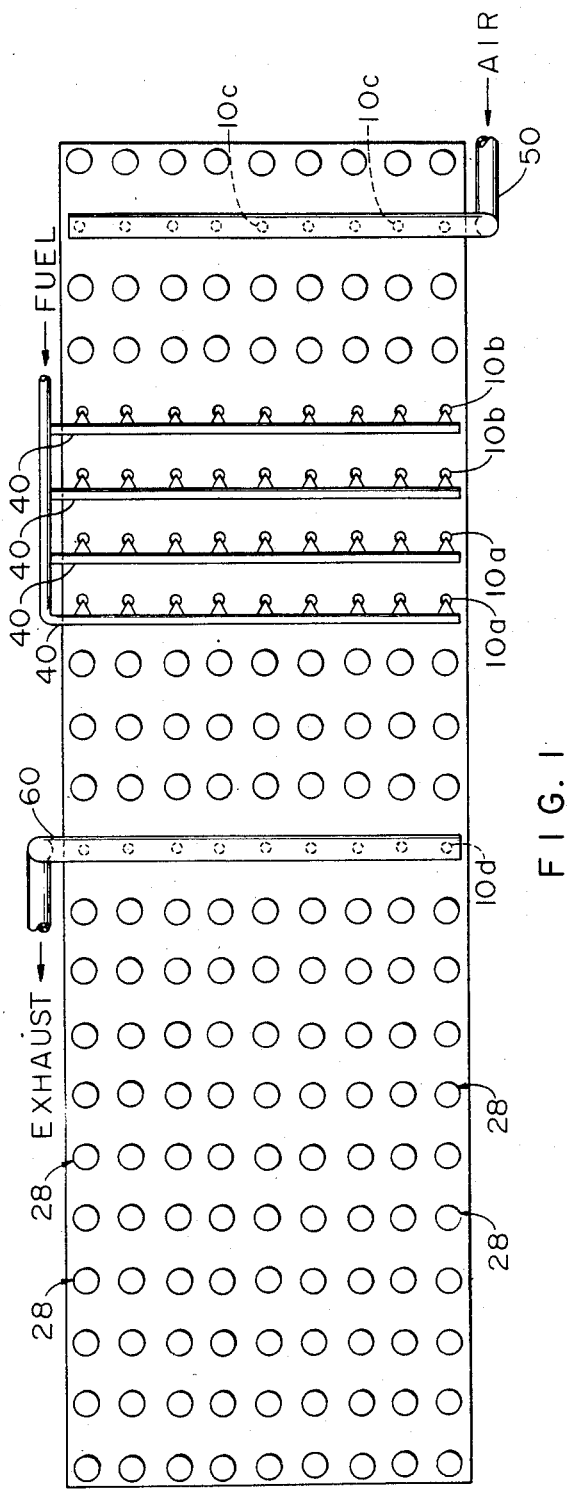
FIG. 1 is a top view of a portion of a baking furnace showing a plurality of ports for ingress and egress to respective pits.
Figure 2:
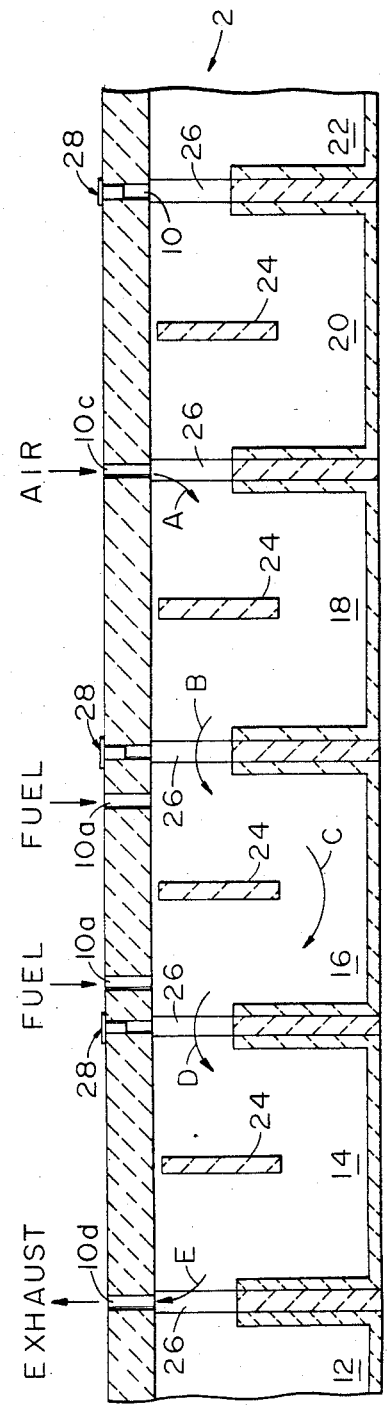
FIG. 2 is a fragmentary side section view of a portion of a baking furnace illustrating several pits.
Figure 3:
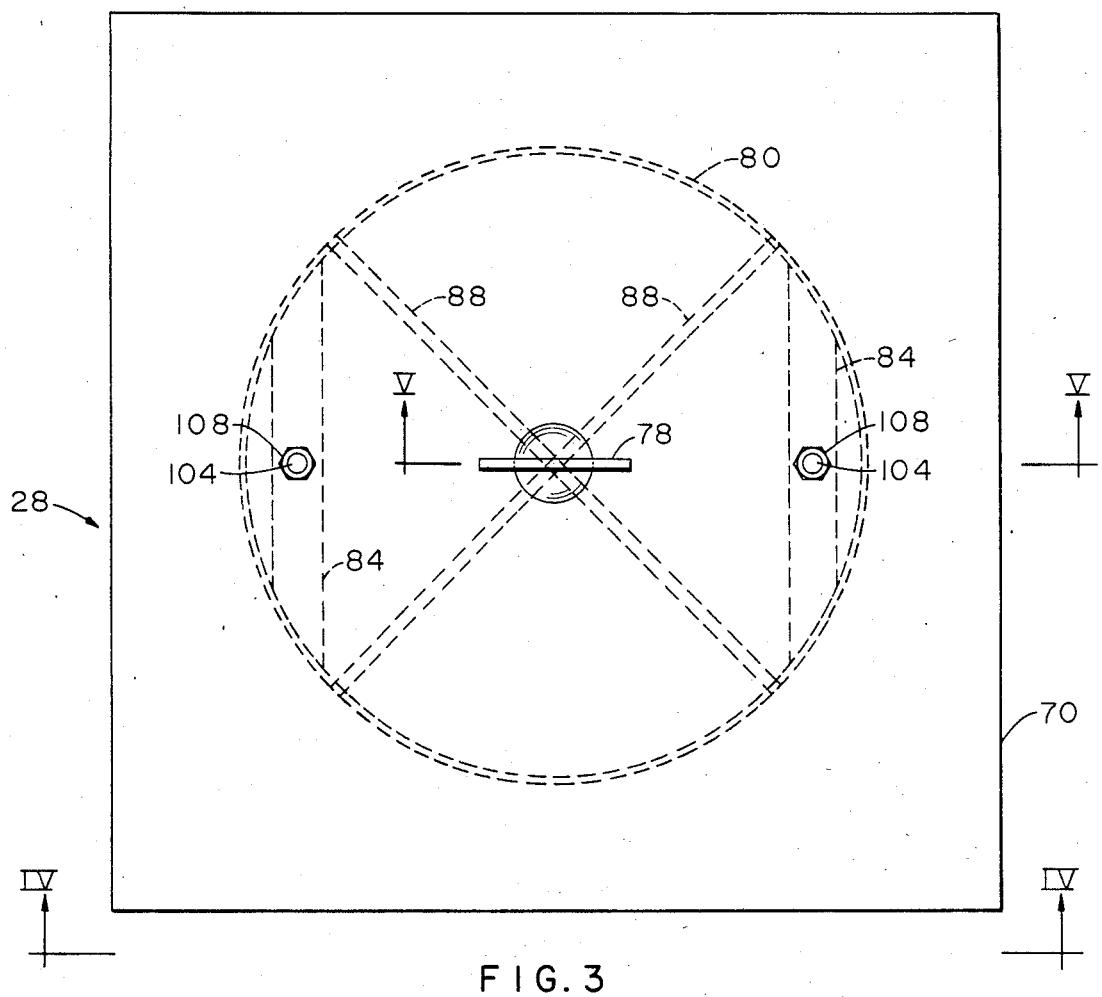
FIG. 3 is a top view of the exhaust plug of the invention.
Figure 4:
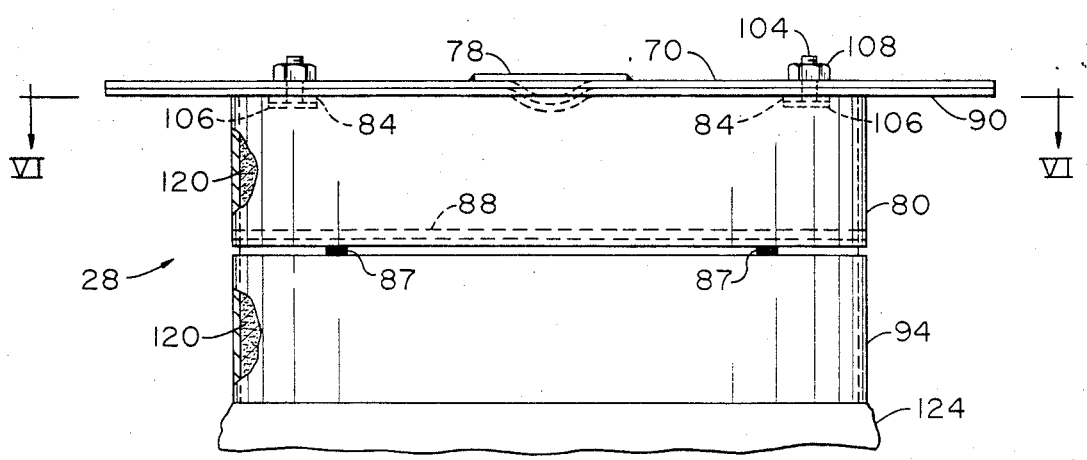
FIG. 4 is a side view of the exhaust plug illustrated in FIG. 3.
Figure 5:
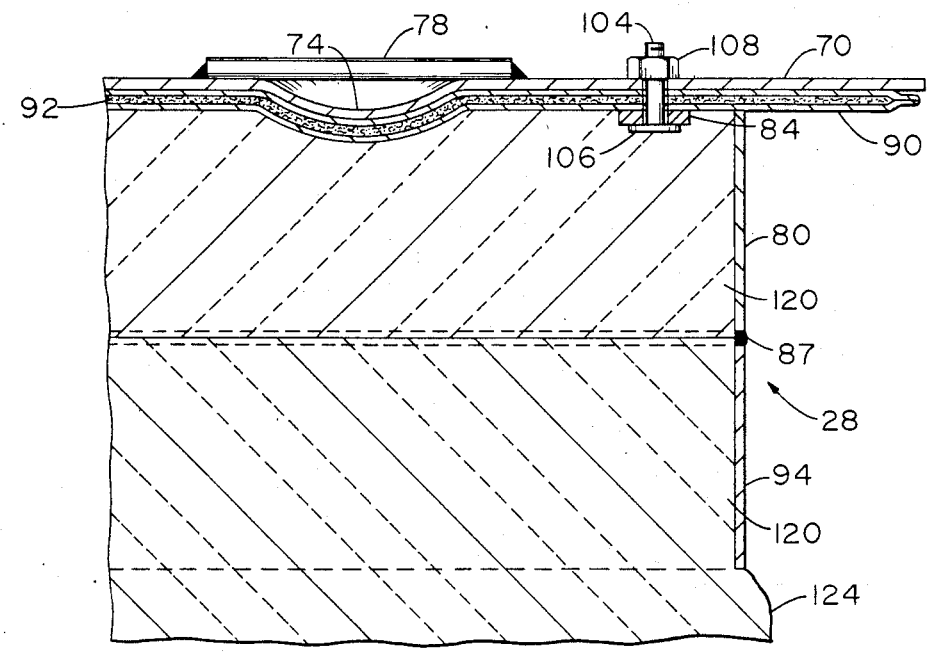
FIG. 5 is a side section view of the exhaust plug of FIG. 3 taken along lines V—V.
Figure 6:
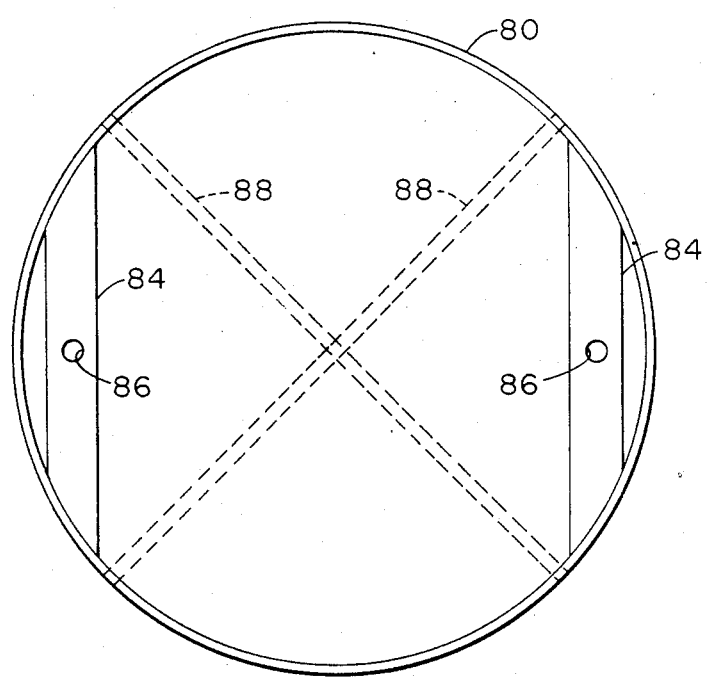
FIG. 6 is a top section view of the exhaust plug taken along lines VI—VI of the view shown in FIG. 4.

Referring now to FIGS. 1 and 2, a portion of a baking furnace is generally illustrated at 2 comprising pits 12, 14, 16, 18, 20 and 22. A plurality of exhaust ports 10 are shown leading into the respective flues which comprise the sidewalls of each pit in furnace 2. Exhaust plugs 28, which must be constructed of materials capable of withstanding the operating temperatures of the baking furnace, as will be described in more detail below, may be initially inserted into each port 10 to seal off the port until it is used as will be explained below.

As more clearly seen in FIG. 2, each pit sidewall may be provided with two such ports with a baffle 24 placed midway therebetween to direct the flow of air or other gases toward the bottom of the flue. Endwall members 26, which separate the flue walls of adjoining pits, are provided with openings through which air or gases may pass from the flue of one pit to the adjoining pit, as shown by arrows B, C, and D.

When anodes are to be baked in one or more pits, the pit or pits are first filled with the green anodes to be baked and then the particular exhaust port plugs 28 are removed to open the port as shown at 10a. It will be noted that FIGS. 1 and 2 differ in that FIG. 1 illustrates two sections of pits, with respective open ports 10a and 10b, being baked at the same time. Usually more than one section of pits will be baked at the same time. FIG. 2, in this respect, is depicted in the compact manner shown for illustrative purpose only to conserve space without sacrificing clarity. A fuel dispensing manifold 40 is positioned above the open ports, as shown in FIG. 1, and fuel nozzles, such as shown in the aforementioned Racunas et al '287 patent, are inserted into the open ports.

At the same time, plugs 28 in a nearby section of pits are opened, as shown at 10c, to provide a source of air into the furnace for combustion with the fuel. Again FIG. 2 shows this in compressed form with FIG. 1 more representative of actual commercial practice. The purpose of admitting the air through ports in a section of pits spaced from the pits to be fired is to permit cooling of anodes in pits previously fired and to utilize this extracted heat to preheat the air to be burned with the fuel in the flue walls of the pits. Thus, as shown in FIG. 1, a manifold 50 which may be connected to a cooling fan (not shown) is inserted into open ports 10c, and cool air is directed into the flue walls of the appropriate pit (shown as pit 18 in FIG. 2). The air, as shown at arrow A in FIG. 2, passes down around baffle 24 and then through wall 26, as shown at arrow B, into the flue to be burned with the incoming fuel.

The hot exhaust gases then pass on through openings in the next flue wall 26, as shown at arrows D and E, to pass out through open ports 10d in a subsequent flue wall to be collected by an exhaust manifold 60, as shown in FIG. 1. Again, although FIG. 2 shows the exhaust gases exiting through the ports in the flue of an immediately adjoining pit, in actuality, as shown in FIG. 1, the hot exhaust gases will, preferably, be circulated serially through the flue walls of several adjoining pits to permit preheating of anodes waiting to be baked which have already been loaded into these pits.

As previously referred to, the baking time for anodes in a section, or sections, of pits is about 32 hours. After this, the cooling manifold, fuel nozzles and exhaust manifold are moved to adjacent ports, after removal of the port plugs, and port plugs are reinserted in the ports just vacated by the firing apparatus. Thus a great number of plugs are constantly in use, and after each baking cycle, a substantial amount of these plugs must be either removed or reinserted, as the case may be. Provision of a lightweight yet durable plug, as proposed by the invention, is thus a necessity for efficient and economical operation of the baking furnace.

Turning now to FIGS. 3-6, the novel exhaust plug of the invention is illustrated. A square cover plate 70, which may comprise a quarter inch mild steel, is provided having a handle 78 welded over an indented middle portion 74 of cover plate 70 to facilitate easy removal of plug 28 from port 10. Bolted to cover 70 via bolts or threaded studs 104 is a gasket 90 which comprises a sandwich of a one-half inch thick insulating ceramic fiber material 92 faced, on the side facing cover plate 70, with a ZETEX type material and on the opposite or "hot" side with a NEXTEL type material capable of withstanding the furnace temperatures. Such a gasket, known as a pillow gasket, is commercially available from Babcock and Wilcox.

Below cover plate 70 is a stainless steel cylinder or band 80 made, preferably, from 1/16" inch thick 310 stainless steel and having straps 84 welded across a portion of the top of the band. In a preferred embodiment, cylinder 80 is eleven inches in diameter and one and one-half inches in length. Each of the straps 84 is provided with an opening 86 to permit mounting of cylinder 80 to cover plate 70. Bolts or threaded studs 104, which are also used to secure gasket 90 to cover plate 70, pass through holes 86 in strap 84, then through gasket 90 and then through openings in cover plate 70 with stud head 106 engaging the underside of strap 84 and nut 108 threaded onto stud 104 to secure the assembly together.

While the invention has been illustrated using a cylindrical shell, its application is not limited thereto. The shell configuration can be multi-sided so as to include box shapes such as squares or rectangles. Additionally, the shell configuration can be rounded so as to include not only cylindrical shapes but also oval or elliptical shapes or combinations of multi-sided shapes with rounded corners.

Compressed within cylinder 80 is a ceramic fiber insulating material 120. Insulating material 120 preferably comprises a blanket of ceramic fibers having an initial density of about 6-9 pounds per cubic foot, preferably about 8 pounds per cubic foot, and compressed, before insertion into cylinder 80, to a density of about 10 to 20, preferably about 15 pounds per cubic foot. In a preferred embodiment, ceramic fiber insulating material 120 comprises a mixture of alumina and silica fibers of about 8-12 centimeters, preferably 10 centimeters in length, and 2.5 to 3.5 micrometers in diameter. Such material is commercially available from Combustion Engineering Corp. under the trademark "Cer Wool". A sufficient amount of insulating material 120 is utilized to permit about 3 inches to protrude from the bottom of cylinder 80.

After insertion of insulating material 120 into cylinder 80, insulating material 120 is retained therein by rods 88 which are inserted diagonally through insulating material 120 and then welded to the bottom edge of cylinder 80.

A second cylinder 94, constructed of similar material and of the same dimensions, is then slipped over the protruding portion of insulating material 120 and fastened, as by welding, to cylinder 80 at 87. The amount of insulating material used is selected to completely fill both cylinders 80 and 94 after compression and to slightly protrude from cylinder 94 as shown at 124. The completed plug assembly weighs about 30 pounds.

Insulated plug 28 may then be inserted into opening 10. When exposed to baking temperatures of 1250° C., the plug was found to be capable of withstanding such temperatures for over 400 hours without visible signs of deterioration.

Thus, the invention provides an improved furnace for the baking of carbon anodes for an electrolytic reduction cell for the production of metal such as aluminum characterized by an improved exhaust port plug having enhanced resistance to deterioration from exposure to the baking temperatures used in the furnace.

Having thus described the invention, what is claimed is:

1. In a baking furnace for the baking of electrodes suitable for use in an electrolytic reduction cell, the improvement comprising an improved exhaust port plug adapted to fit into a port in said furnace which comprises:
    (a) a shell having a cross-section approximating the cross-section of said port, said shell comprising two shell portions fastened together;
    (b) a cover member on said shell having a dimension exceeding the dimension of the port;
    (c) a gasket means on the underside of said cover member surrounding said shell and adapted to sealingly engage an external portion of the furnace, said gasket means comprising a plurality of layers comprising a first outer layer facing said packed ceramic fibers and capable of withstanding the operating temperature of said baking furnace, an inner insulating layer of ceramic fibers, and an outer sealing layer in contact with the underside of said cover member;
    (d) a mat of packed ceramic fibers within the shell;
    (e) retaining means to retain said mat of ceramic fibers within said metal shell comprising rod means fastened to said shell which pass through said packed ceramic fibers at a point spaced from the ends of said shell where said shell portions are joined together; and
    (f) means thereon for removably mounting said shell to said cover comprising strap means secured to an end of said shell and threaded mounting means engaging said strap means, said mounting means having a threaded end passing through an opening in said gasket means and said cover member to removably secure said cover member, said gasket means, and said shell together.

2. The improvement in accordance with claim 1 wherein said shell has a rounded configuration.

3. The improvement in accordance with claim 1 wherein said shell is box shaped.

4. The improvement in accordance with claim 1 wherein said shell has a substantially cylindrical configuration.

5. In a baking furnace for the baking of anodes for use in an electrolytic reduction cell, the improvement comprising an improved exhaust port plug for a port in said furnace comprising:
    (a) a cylindrical metal shell having a diameter approximating the diameter of said port and comprising two cylinders fastened together;
    (b) a cover member on said shell having a dimension exceeding the diameter of said port and having a central handle thereon;
    (c) a mat of packed ceramic fibers within the shell comprising a mixture of from about 40 to 50 wt. % alumina fibers and from about 45 to 55 wt. % silica fibers, said ceramic fibers having a diameter of from 2.5 to 3.5 micrometers and a length of from about 8 to 12 centimeters and having an initial density of about 6 to 9 pounds per cubic inch and compressed within said shell to a density of from 10 to 20 pounds per cubic inch;
    (d) gasket means on the underside of said cover member surrounding said shell and adapted to sealingly engage an external portion of said furnace comprising a plurality of layers including a first outer layer facing said packed ceramic fibers and capable of withstanding the operating temperature of said baking furnace, an inner insulating layer of ceramic fibers, and an outer sealing layer in contact with the underside of said cover member;
    (e) mounting means associated with said shell for removably mounting said shell to said cover comprising strap means secured to an end of said cylinder and threaded mounting means engaging said strap means, said mounting means having a threaded end passing through an opening in said gasket means and said cover member to removably secure said cover member, said gasket means and said shell together; and
    (f) retaining means to retain said mat of ceramic fibers within said metal shell comprising rod means fastened to said shell which pass through said packed ceramic fibers at a point spaced from the cylindrical ends of said shell where said cylinders are joined together.

6. In a baking furnace for the baking of electodes suitable for use in an electrolytic reduction cell, the improvement comprising an improved exhaust port plug adapted to fit into a port in said furnace which comprises:
    (a) a cylindrical shell having a diameter approximating the diameter of said port, said shell comprising two cylinders fastened together;
    (b) a cover member on said shell having a dimension exceeding the diameter of the port;
    (c) a gasket means on the underside of said cover member surrounding said shell and adapted to sealingly engage an external portion of the furnace, said gasket means comprising a plurality of layers comprising a first outer layer facing said packed ceramic fibers and capable of withstanding the operating temperature of said baking furnace, an inner insulating layer of ceramic fibers, and an outer sealing layer in contact with the underside of said cover member;
    (d) a mat of packed ceramic fibers within the shell;
    (e) retaining means to retain said mat of ceramic fibers within said metal shell comprising rod means fastened to said shell which pass through said packed ceramic fibers at a point spaced from the cylindrical ends of said shell where said cylinders are joined together; and
    (f) means thereon for removably mounting said shell to said cover comprising strap means secured to an end of said cylinder and threaded mouting means engaging said strap means, said mounting means having a threaded end passing through an opening in said gasket means and said cover member to removably secure said cover member, said gasket means, and said shell together.

7. The improvement of claim 6 wherein said ceramic fibers comprise a fiber blanket having an initial density of about 6 to 9 pounds per cubic inch prior to compression for insertion into said shell.

8. The improvement of claim 7 wherein said ceramic fiber blanket is compressed to a density of from 10 to 20 pounds per cubic inch.

9. The improvement of claim 8 wherein said ceramic fiber blanket is compressed to a density of about 15 pounds per cubic inch.

10. The improvement of claim 8 wherein said ceramic fiber blanket comprises ceramic fibers selected from the class consisting of alumina fibers, silica fibers and mixtures thereof.

11. The improvement of claim 10 wherein said ceramic fibers comprise a mixture of from about 40 to 50 wt. % alumina fibers and from about 45 to 55 wt. % silica fibers.

12. The improvement of claim 11 wherein said mixture of alumina and silica fibers comprise fibers having a diameter of from 2.5 to 3.5 micrometers and a length of from about 8 to 12 centimeters.

* * * * *